United States Patent [19]
Abdullaev

[11] 3,812,363
[45] May 21, 1974

[54] PROBE FOR MEASURING CHARACTERISTICS OF SUBSURFACE AND GROUND WATER FLOW

[76] Inventor: Abakar Abakarovich Abdullaev, kvartal 2, 11, kv. 31, massiv Chilanzar, Tashkent, U.S.S.R.

[22] Filed: Nov. 18, 1971

[21] Appl. No.: 199,850

[52] U.S. Cl. .............................................. 250/388
[51] Int. Cl. ..................... G21h 5/02, G01n 23/12
[58] Field of Search ..... 250/43.5 FC, 106 L, 106 T, 250/108 R

[56] References Cited
UNITED STATES PATENTS

| | | | |
|---|---|---|---|
| 2,322,634 | 6/1943 | Howell et al. | 250/106 T X |
| 2,433,718 | 12/1947 | Teplitz | 250/43.5 FC X |
| 2,947,359 | 8/1960 | Josendal et al. | 250/43.5 FC X |
| 2,986,639 | 5/1961 | Josendal et al. | 250/43.5 FC X |

*Primary Examiner*—Archie R. Borchelt
*Attorney, Agent, or Firm*—Eric H. Waters

[57] ABSTRACT

A probe for determining the characteristics of subsurface and ground water flow by a single-well method with the aid of radioactive isotopes, wherein a radio-isotope radiation receiver consists of at least three gas-discharge counters each of which is separately connected with a device which registers pulses carrying information about the characteristics of the subsurface or ground water flow being measured. The gas-discharge counters are fastened in longitudinal slots of a hollow protective shield of a cylindrical shape formed at equal distances on its outer surface. The shield has open lengthwise grooves between the longitudinal slots, while inside the shield there is disposed a shell with enclosed radioactive isotopes so that the radioactive isotopes carried out of the well by the subsurface of ground water flow through the lengthwise grooves and, act upon the gas-discharge counters disposed in the longitudinal slots in the immediate vicinity of the well water outflow.

1 Claim, 2 Drawing Figures

PROBE FOR MEASURING CHARACTERISTICS OF SUBSURFACE AND GROUND WATER FLOW

The present invention relates broadly to geophysical instruments for investigating the characteristics of flow of subsurface and ground waters and, more particularly, to probes for estimating the characteristics of subsurface and ground water flow, namely, for determining the filtration rate, the direction of subsurface and ground water flow and the wa-ter flow rate in a single well, by immersing the probe to a required depth in a well together with a radioactive isotope enclosed in a shell.

A probe of this invention can be applied for hydrogeological, hydraulic engineering and hydromeliorative studies of subsurface and ground water flow.

Prior art probes for estimating the characteristics of subsurface and ground water flow by a single-well method with the aid of radioactive isotopes enclosed in a shell comprise a case wherein is contained a radioactive isotope radiation receiver in the form of at least three gas-discharge counters disposed at equal distances in longitudinal slots formed on the outer surface of a cylindrically-shaped protective shield made of a material opaque for a given kind of radioisotope radiation, each counter being individually connected with a device which registers pulses coming from the gas-discharge counters and carrying information about the characteristics of the subsurface or ground water flow under measurement.

In these known probes, the protective shield is solid.

The use of these probes for measuring the characteristics of subsurface and ground water flow requires that prior to measurement, radioactive isotopes be injected in a well by means of special injectors with their subsequent uniform mixing in the water column.

Since the injection of radioactive isotopes, their uniform mixing and subsequent immersion of the probe in a well requires certain time during which the isotopes may be carried far away from the well if the flow velocity is high, the probes of above design are inapplicable for measuring such relatively high-velocity flows of subsurface and ground waters.

It is an object of this invention to provide a probe for determining the characteristics of subsurface and ground water flow which will enable reliable, simultaneous and quick estimation of the characteristics of subsurface and ground water flow (filtration rate, direction of the flow and water flow rate) at both low and high flow velocities without rotating the probe (to determine the direction of the flow), without its subseqeunt mechanical pressing to the wall of the well (to determine the rate of filtration), and without preliminary injection of radioactive isotopes in the well.

To accomplish the foregoing object, in a probe for estimating the characteristics of surface and ground water flow by a single-well method with the aid of radioactive isotopes enclosed in a shell, which comprises a case wherein is disposed a radioisotope radiation receiver in the form of at least three gas-discharge counters located at equal distances in longitudinal slots formed on the outer surface of a cylindrically shaped protective shield made of a material opaque for this kind of radioactive radiation, and each of which is separately connected with a device for registering pulses which come from the gas-discharge counters and carry information about the measured characteristics of subsurface or ground water flow, according to this invention, a protective shield is hollow and has open lengthwise grooves between the longitudinal slots holding the gas-discharge counters, the shell with the radioactive isotopes being housed inside the hollow protective shield so that the radioactive isotopes carried out of the well by the subsurface or ground water flow through the grooves, act upon the gas-discharge counters disposed in the slots in the immediate vicinity of the well outflow.

The probe provided by the invention enables a simultaneous and quick determination of the characteristics of subsurface and ground water flow (rate of filtration, direction of the flow and water flow rate) by a single-well method without preliminary introduction of radioactive isotopes and their mixing in a water column in the well, without rotating the probe and its subsequent pressing to the wall of the well.

The present probe also permits more accurate measurement of the characteristics of subsurface and ground water flow at relatively high flow velocities and using small amounts of radioactive isotopes. Besides, unobstructed passage of water through the open grooves reduces errors caused by the effect of the probe fitted with a solid protective shield on the water flow.

The present invention may be more fully understood from the following description of a preferred embodiment thereof when read with reference to the accompanying drawings, in which.

The probe of this invention for determining the characteristics of subsurface and ground water flow will be considered relative to the single-well method of measuring flow parameters by means of radioactive isotopes. The probe disclosed herein provides simultaneous, quick and accurate measurement of high and low rates of filtration, the direction of flow and water flow rate in one well.

The radioactive isotope used in a the probe is radioactive iodine—$131_I$. However, use can also be made of other radioisotopes with an appropriate half-life whose radiation energy would enable use of a small-size protective shield suitable for conventional wells.

Figure 1:
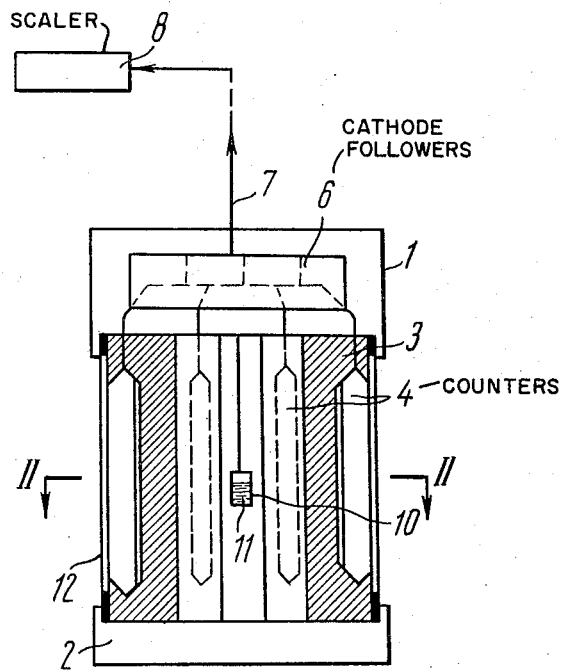
FIG. 1 is a vertical sectional view of a probe for estimating the characteristics of surface water flow.

The probe of this invention comprises a hermetic case consisting of a cover 1 (FIG. 1) and support 2 to which are attached the edges of a hollow protective lead shield 3 of a cylindrical shape (the shield is made of a material opaque for the given kind of radioisotope radiation).

Figure 2:
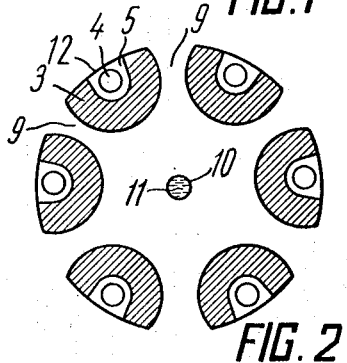
FIG. 2 is a sectional view of the same probe taken along line II—II in FIG. 1.

The cover 1 and the support 2 carry also a radioisotope radiation receiver consisting of six gas-discharge counters 4 disposed at equal distances in longitudinal slots 5 (FIG. 2) formed on the outer surface of the protective shield 3.

Each counter 4 (FIG. 1) has a separate connection with a device for registering pulses comming from these counters which carry information on the characteristics of the subsurface (or ground) water flow being measured. The pulse registering device comprises cathode followers 6 for each gas-discharge counter 4 disposed in the cover 1 of the hermetic case and coupled by a multi-core connecting cable 7 with a ground-based radiation counting scaler (radiometer) 8.

The protective shield 3 (FIG. 2) has open lengthwise grooves 9 between the longitudinal slots 5 accommodating the gas-discharge counters 4.

In the probe disclosed herein a shell 10 (FIGS. 1 and 2) containing radioactive isotopes 11 is housed inside the protective shield 3 so that the radioactive isotopes 11 carried out of the well by subsurface (or ground) water flow through grooves 9, and act on gas-discharge counters 4 disposed in slots 5 in the immediate vicinity of the well flow outlet. The radioactive isotopes used for injection into subsurface or ground waters can be placed in the water-soluble shell 10. Special electromagnetic or other mechanical injectors mechanically linked with the cover I of the hermetic case, can be also be used.

The gas-discharge counters 4 are closed with a watertight envelope 12 and are disposed at equal distances in the longitudinal slots 5 formed on the outer surface of the protective shield 3 so that the stationary probe provides measurement of the characteristics of subsurface (or ground) water flow at a preset depth with a required degree of accuracy.

Immersion of the probe in a well and fixation of its gas-discharge counters 4 with respect to the cardinal points are effected by mechanical attachment of the probe to rods (not shown in the drawing). The probe is immersed in a well by gravity and under the effect of the weight of the connecting cable 7.

If necessary, the probe can be centered in a well by means of three or four steel springs (not shown in the drawing). One end of each spring is secured to the case of the probe, while the other end can be shifted any way on the case, depending on the diameter of the well, and fastened in this position.

The operating principle of the probe of this invention for determining the characteristics of subsurface and ground water flow is as follows.

Before injection, the radioactive isotopes are placed into the water-soluble shell 10 of such a thickness as required for preventing its dissolving before the probe reaches a preset depth.

After the gas-discharge counters have been oriented with respect to the cardinal points and fixed by means of rods, the probe is lowered into a well at a given depth, the radiometer 8 is switched on, and the radioactive isotope is injected into the water from the water-soluble shell 10.

Then, on the basis of the readings of the radiometer 8 (FIG. 1) corresponding to each of the numbered gas-discharge counters 4, a vector diagram (curve) of the pulses is plotted, which enables determination of the direction of the flow. The rate of the flow is measured by the decrease of the activity of the radioisotope used in time which defines the entrainment of the isotope from the well by the water flow. The flow rate of subsurface (or ground) waters can be found if the size of the well and the rate of filtration are known.

If the radiometer 8 incorporates one mechanical counter (not shown in the drawing), the activity of the radioisotopes is measured by alternate connection of the gas-discharge counters 4 with the help of a switch (not shown in the drawing). On the other hand, if the radiometer 8 has mechanical counters whose number equals the number of the above gas-discharge counters 4, such switching-over is not needed.

The present invention enables studies of the characteristics of subsurface and ground water flow at not only low, but also relatively high velocities.

What is claimed is:

1. A probe for measuring the characteristics of subsurface and ground-water flow by a single-well method, with the help of radioactive isotopes, comprising: a case, a radio-isotope radiation receiver disposed in said case; a hollow protective shield of cylindrical shape also housed in said case and made from a material opaque to a given kind of radioactive radiation; longitudinal slots disposed at equal distances on the outer surface of said shield; open lengthwise grooves in said shield, located between said slots; at least three gas-discharge counters for said reciever, secured in said slots; a water-soluble shell holding the isotopes, disposed within said shield so that the radio-isotopes are carried out of the well with the subsurface and ground-water flow through said grooves and act upon said counters in the immediate vicinity of the outflow from the well; and a pulse registering device individually connected with said counters, for individually registering the pulses coming from said counters and furnishing information to an indicator of the scaler type about the measured characteristics of the subsurface and ground-water flow.

* * * * *